(No Model.)  3 Sheets—Sheet 1.

P. PATTERSON.
PIPE DRAWING APPARATUS.

No. 251,459.  Patented Dec. 27, 1881.

Witnesses
J. G. Kay
Lewis McMullen

Inventor
Peter Patterson
By Attorney
James T. Kay (No Model.) 3 Sheets—Sheet 3.

P. PATTERSON.
PIPE DRAWING APPARATUS.

No. 251,459. Patented Dec. 27, 1881.

Witnesses.
J. G. Kay
Lewis McMullen

Inventor Peter Patterson
By Attorney James T. Ray

UNITED STATES PATENT OFFICE.

PETER PATTERSON, OF McKEESPORT, PENNSYLVANIA.

PIPE-DRAWING APPARATUS.

SPECIFICATION forming part of Letters Patent No. 251,459, dated December 27, 1881.

Application filed August 3, 1881. (No model.)

*To all whom it may concern:*

Be it known that I, PETER PATTERSON, of McKeesport, in the county of Allegheny and State of Pennsylvania, have invented a new and useful Improvement in Pipe-Drawing Apparatus; and I do hereby declare the following to be a full, clear, and exact description thereof, reference being had to the accompanying drawings, forming a part of this specification, in which—

Figure 1:
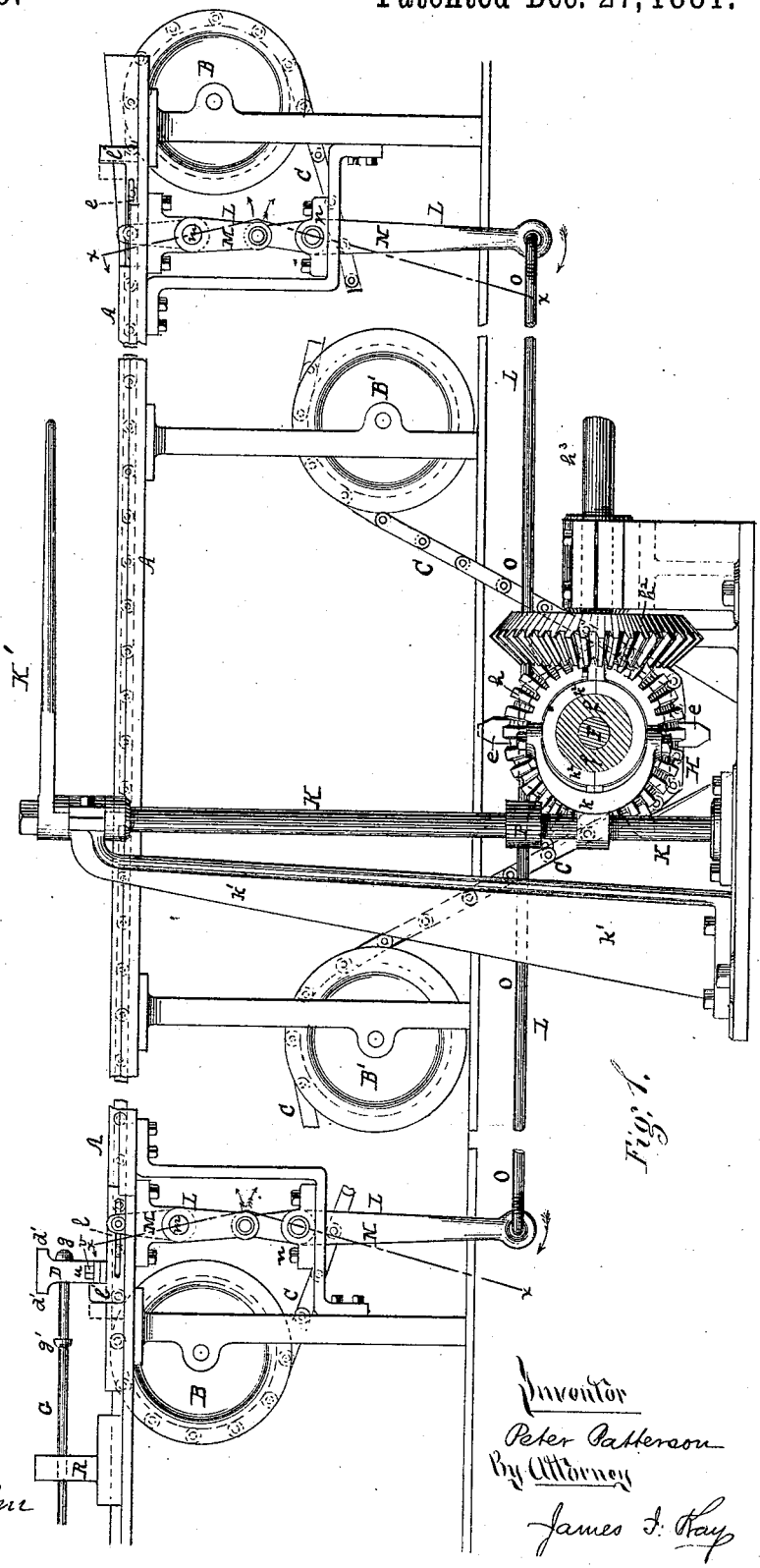
Figure 2:
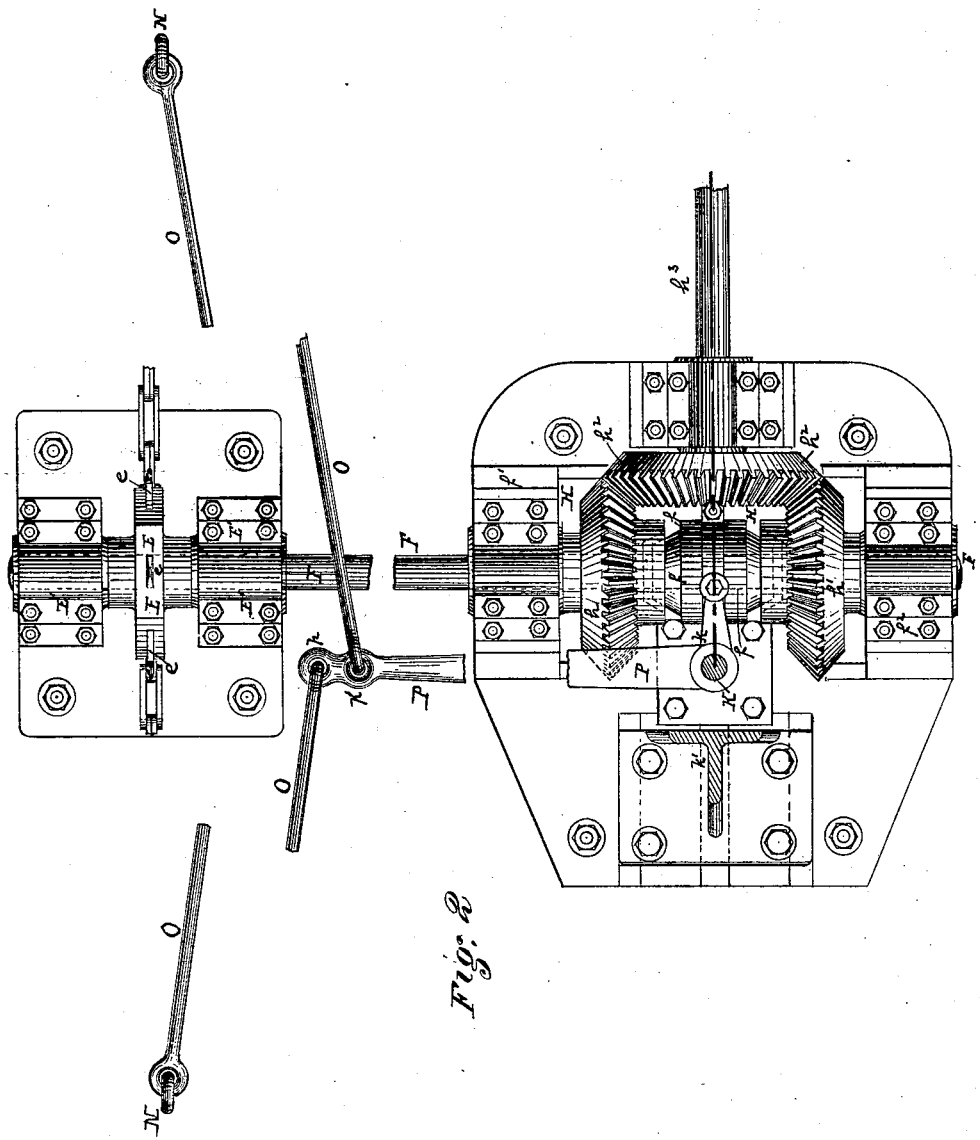
Figure 3:
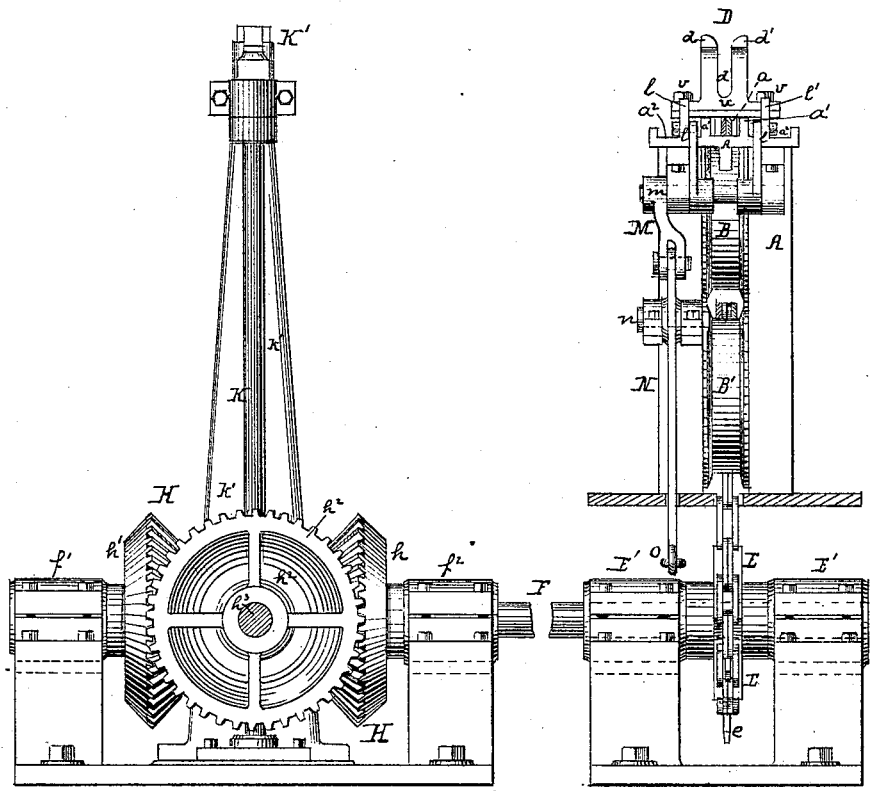
Figure 4:
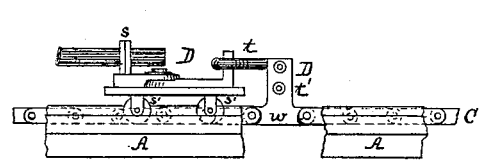
Figure 5:
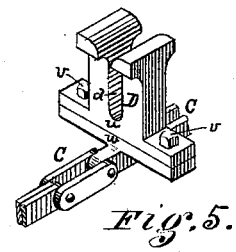

Figure 1 is a side view of my improved apparatus for drawing pipe. Fig. 2 is a plan view, partly broken away. Fig. 3 is an end view, the bull-wheel being removed. Fig. 4 is a detached view, showing a different style of buggy; and Fig. 5 is a detached perspective view of my improved buggy.

Like letters of reference indicate like parts in each.

My invention relates to apparatus for drawing pipe in the manufacture of butt-weld tubing, its object being to provide automatic apparatus for drawing the pipe or tubing through the welding bell or tongs and to return it to the furnace, and thus to do away with much of the labor heretofore necessary to bring the operation of the machinery under the control of one person and to render the more rapid operation of the machinery possible.

The apparatus heretofore employed for drawing pipe consisted of a draw-bench, in which worked an endless chain traveling continually in one direction, and on which was mounted a buggy, which grasped the pipe by suitable tongs and was connected to the chain by a hook dropped by the operator or buggy-boy into a link in the chain. The traveling chain then carried the buggy with it, drawing the pipe through the welding bell or tongs, and the buggy was disconnected from the chain by raising the hook out of the link, the pipe being then pushed forward by the welder, so as to deliver it into the furnace for heating before its second reduction and the buggy pushed forward by the buggy-boy. As the chain traveled rapidly, the operation of this buggy on the draw-table was extremely wearing, several persons being needed for the work, each one working but a short turn. By my invention the same work is performed automatically and much more rapidly, the whole operation being controlled by a single lever operated by a boy.

It consists, first, in a draw-bench, a traveling chain working therein and having a pipe-drawing buggy secured thereto, bull-wheels mounted at the ends of the draw-bench, and a cat-wheel mounted under the draw-bench and adapted to draw the chain in either direction, so that by reversing the cat-wheel the buggy is caused to travel in either direction along the draw-bench and draw the pipe in welding, or return it to the furnace as desired; second, in lever mechanism for reversing and controlling the movement of the chain and traveling buggy; third, in stop apparatus for automatically stopping the movement of the chain when the buggy approaches either end of the draw-bench; fourth, in certain improvements in the construction of the buggy; and, fifth, in certain improvements in the arrangement of the apparatus employed in carrying out my invention.

To enable others skilled in the art to make and use my invention, I will describe its construction and operation.

My improved apparatus is mounted in front of the usual furnace, in which the skelp or tubing is brought to a welding heat before being welded thereon.

A represents the draw-bench, which is formed the usual length, and is supported in suitable manner on a level with the furnace-door. Along the center of the draw-bench is the gutter or recess $a$, in which the endless chain C travels, the sides $a'$ of the gutter extending up so as to form a slide, on which rests and slides the buggy D when it is not provided with rollers or wheels, and the track $a^2$ being formed on either side of the gutter along which track the buggy travels when mounted on rollers.

At either end of the bench A is mounted the loose bull-wheel B, and at suitable intervals under the bench are like wheels, B', the endless chain C passing along the gutter $a$, around the bull-wheels B and over the wheels B', to the power mechanism. The buggy D is rigidly secured, by bolting or other suitable means, to the chain C, so as to travel backward and forward on the draw-bench, according to the movement of the chain. This is either accomplished by bolting or otherwise securing it to a link, or by forming the base $w$ of the buggy to fit as a link in the drive-chain, as shown in Fig. 5, the upper part of the base fitting over the slides $a'$, and having bolts $v$, by which the head $u$ of the buggy is secured to the base $w$. This latter construction is preferred, as the head can be more readily changed to suit the different diameters of pipe to be welded. The buggy either slides in the sides $a'$ of the gutter $a$ or moves by means of rollers along the track $a^2$. In the center of the buggy D is the slot $d$, in which fits the rod G, which is attached to the tube-skelp, and by means of which it is drawn through by the machine. On either side of the slotted head of the buggy are the lugs $d'$, which extend out so as to prevent the rod G from being raised out of the slot by the strain in drawing or returning the tube to the furnace. The rod G has two annular rings, $g\ g'$, formed around it a suitable distance apart, which catch against the side of the slot and enable the buggy to draw or push the rod, the rod being dropped into the slot $d$ between these rings.

E is the propelling or cat wheel, which is rigidly secured to the shaft F, mounted in suitable housings E' under the draw-bench, and the endless chain C passes from the bull-wheels B' under the cat-wheel, the teeth $e$ of the cat-wheel fitting within each alternate link of the chain, and, on the rotation of the cat-wheel, drawing the chain in whichever direction is desired. The shaft F extends from the cat-wheel E through the friction or reversing gear H, being mounted in bearings $f'\ f^2$ in the gearing-frame, and having loosely mounted on it the bevel-gear wheels $h\ h'$, which mesh into the bevel-gear wheel $h^2$ on the power-shaft $h^3$. On the shaft F, between the gear-wheels $h\ h'$, is mounted the friction-clutch $f$, the clutch being secured to the shaft by means of a feather, so that it rotates with the shaft, but is capable of longitudinal movement thereon, so that it can be thrown in connection with either of the gear-wheels $h\ h'$, according to the direction in which the shaft is to rotate. Power is communicated to the shaft $h^3$ in any desired manner. Secured to the base-plate of the friction-gearing is the standard $k'$, which extends up about even with the draw-bench and supports the upper end of the upright lever-shaft K, its base being journaled in the base-plate. The shaft K has a yoke, $k$, extending around the friction-clutch $f$, and secured to a ring, $k^2$, fitting in an annular groove in the friction-clutch, by means of which a longitudinal movement is imparted to the friction-clutch on the turning of the lever-shaft. At the top of the shaft K is the lever K', by means of which the operator moves the friction-clutch to stop or reverse the apparatus, the apparatus being turned in either direction, according to the bevel-wheel $h$ or $h'$, with which the friction-clutch $f$ engages, and its operation ceasing when the clutch is held so that it engages with neither bevel-wheel.

At either end of the draw-bench A is arranged the automatic stop apparatus L, by means of which the movement of the drive-chain C is automatically stopped by the buggy D before it reaches the end of the draw-bench. This stop apparatus consists of a slide, $l$, mounted on the draw-bench A, having a lug, $l'$, extending up into the course of the buggy, and certain lever mechanism connecting with the lever-shaft K, so that when the buggy pushes against the lug $l'$ of the slide through the lever mechanism it turns the shaft K so as to open the connection between the friction-clutch and bevel-gear.

The lever mechanism consists of the lever M, pivoted at $m$, one end being secured to the slide $l$ and the other pivoted to the lever N, which lever is pivoted at $n$, and the lower end of this lever is connected by a rod, O, to the arm P, rigidly secured to the lever-shaft K. The arm P has two loops or eyes, $p\ p'$, at its end, the rods from the stop apparatus L, at each end of the draw-bench, being connected to this lever, one in each loop. When the lever-shaft K is turned by the operator by means of the arm P and lever mechanism, it throws the slide toward which the buggy is traveling forward, and when the buggy comes in contact with and pushes the slide back to its normal position it opens the clutch, as above described. To insure the proper movement of the slide $l$, it is provided with lugs on either side of the gutter, as shown in Fig. 3.

R represents a guide, between the furnace and draw-bench, for supporting the pipe as it is drawn by the apparatus and directing its movement when pushed back into the oven.

In Fig. 4 is shown the construction of the buggy, where half of the pipe is first welded and the other half welded afterward, this being the common way of making butt-weld tubing. In this case the buggy is provided with suitable jaws, $s$, by which the pipe is held while being drawn, and with rollers $s'$, working in the track $a^2$ of the draw-bench. It is connected by means of the link $t$ to the pin $t'$, the base of which fits as a link in the drive-chain, or which is rigidly secured to a link of the drive-chain, and motion is thus imparted to the buggy, so that it travels back and forth over the draw-bench, according to the movement of the chain.

The operation of my improved pipe-drawing apparatus is as follows: Where the entire pipe is drawn through the welding bell or tongs at one operation, the rod G is welded to the skelp, as is usual in forming pipe in that manner. The rod G is then dropped by the welder into the slot $d$ of the buggy D, between the rings $g\ g'$ on the rod. The lever-operator by means of the lever K' throws the friction-clutch in connection with the bevel-gear $h$, and thus imparts motion to the propelling or cat wheel E, which, through the drive-chain C, draws the buggy D along the draw-bench, the chain traveling in the gutter $a$ and the buggy sliding along the slides $a'$. The movement of the lever-shaft K by the lever K' also causes the like movement of the arm P, which imparts its movement to the rods O, the rod leading to the rear stop apparatus, L, being drawn forward, and the one leading to the front stop apparatus being pushed forward. The movement imparted to the rear rod O draws on the lever N, which in turn causes the lever M to push forward the slides l, this motion being shown by the single dotted line x x. The movement of the front rod O has a like effect, throwing the slide farther forward, so that a corresponding movement in the same direction backward or forward is always imparted to the front and rear stop apparatus by the movement of the lever. As the buggy D is drawn forward the ring g on the rod G comes against and is held by the sides of the slot d, and, by means of the buggy, continues to draw the pipe through the welding bell or tongs, traveling back along the draw-bench until the operator stops the movement of the drive-chain by disconnecting the friction-clutch f from the bevel-gear h by turning the lever K', when the entire length of tubing is welded. If, however, the operator fails or neglects to check the movement of the buggy, as above described, the buggy is carried on by the chain until it comes in contact with and pushes back the slide l of the rear stop apparatus, L. The movement of the slide l through the pivoted levers M N, rod O, and arm P turns the lever-shaft K, so as to disconnect the friction-clutch from the bevel-gear h and stop the apparatus, thus precluding the danger of accident if the operator should neglect his duty. The movement of the stop apparatus by the buggy also draws all the parts of the apparatus to their normal position, as shown in full lines, drawing back the front slide l as it moves with the other slide. To return the tubing to the furnace, the operator by the lever K' then throws the friction-clutch f into connection with the other bevel-gear, h', thus reversing the cat-wheel and drawing the drive-chain forward, and at the same time, through the arm P, rods O, and levers M N at the front of the apparatus, throwing the forward slide l back into the course of the buggy D, when it approaches the front of the draw-bench, a corresponding movement being imparted to the rear slide, as above described. The buggy D is then carried forward and slides along the rod G until it comes against the ring g' on the rod, when it pushes the pipe forward into the furnace until checked, as above described, by the lever K', or until it engages with the forward slide and disconnects the friction-clutch and bevel-gear h', in the manner described as to the rear stop apparatus.

In general practice the backward movement of the buggy in drawing the pipe is stopped by the operation of the lever K' as soon as the entire pipe is drawn through the welding bell or tongs, and the forward movement of the buggy, as it returns the pipe to the furnace, is checked by the front stop apparatus, the rear stop apparatus being only employed to prevent accident. The rings g g' on the welding-rod G are placed a short distance apart, so that so much care is not needed on part of the welder in dropping it into the slot of the buggy. The lugs d' on the buggy prevent the rod from being raised out of the slot by the pressure in drawing or returning the pipe to the furnace. The advantages of this buggy for rapid work over the usual buggy, where the rod is caught by clutches or tongs, is apparent. When a buggy having a slot suitable for different-sized pipe is needed the head u of the buggy may be easily removed from the base w, as above described, and changed as desired.

Where but half of the pipe is drawn and welded at one operation (this being the most common method practiced in the manufacture of butt-weld tubing) the buggy shown in Fig. 4 is employed, and the pipe itself is griped by the buggy, instead of its holding the rod welded to the pipe-skelp. The operation of the apparatus with this old style of buggy is substantially the same as above described, and its use therewith will be found equally advantageous.

By my improved pipe-drawing apparatus I am enabled to bring the entire operation of drawing the pipe under the control of one boy, and by means of a lever, all the arduous labor of drawing pipe being done away with, and the labor of two extra hands being dispensed with. I am also able to operate the apparatus at a greater speed, and consequently accomplish much more work than on the ordinary pipe-drawing apparatus.

It is evident that my improved apparatus may be employed to advantage in drawing tube-skelp, and in many other places where a traveling drive-chain is used, and hence I do not limit myself to its use in welding tubing.

What I claim as my invention, and desire to secure by Letters Patent, is—

1. In pipe-drawing apparatus, the combination of the draw-bench A, traveling drive-chain C, having the pipe-drawing buggy D secured thereto, bull-wheels B at the ends of the draw-bench, and cat-wheel E, mounted under the draw-bench and adapted to draw the chain in either direction, substantially as and for the purposes set forth.

2. The combination of the buggy D, provided with the slot d, and the welding-rod G, having the rings g g', substantially as and for the purposes set forth.

3. The combination of the buggy D, provided with the slot d and lugs d', and the welding-rod G, having the rings g g', substantially as and for the purposes set forth.

4. The buggy D, formed of the base w, secured in the drive-chain C, and the head u, removably secured to the base, substantially as and for the purposes set forth.

5. The combination of the draw-bench A, the drive-chain C, traveling therein, the propelling-wheel E, and the reversing-gearing H, whereby the direction of movement of the wheel E may be reversed or stopped, substantially as and for the purposes set forth.

6. The combination of the draw-bench A, the drive-chain C, traveling therein, the propelling-wheel E, clutch $f$, bevel-wheels $h\ h'$, revolving in different directions, and the lever-shaft K, to operate said clutch, substantially as and for the purposes set forth.

7. The combination of the draw-bench A, the drive-chain C, traveling therein, and buggy D, with the stop apparatus L, substantially as and for the purposes set forth.

8. The stop apparatus L, mounted at the end of the draw-bench and formed of the slide $l$, levers M and N, rod O, and arm P, connecting with the reversing-gear, substantially as and for the purposes set forth.

9. The combination of the draw-bench A, drive-chain traveling therein, buggy D, stop apparatus L, lever-shaft K, and reversing-gear H, substantially as and for the purposes set forth.

10. The combination of the draw-bench A, drive-chain traveling therein, propelling-wheel E, reversing-gear H, lever-shaft K, and lever K', substantially as and for the purposes set forth.

In testimony whereof I, the said PETER PATTERSON, have hereunto set my hand.

PETER PATTERSON.

Witnesses:
F. G. KAY,
JAMES I. KAY.